(12) United States Patent
Kracker et al.

(10) Patent No.: US 7,599,136 B2
(45) Date of Patent: Oct. 6, 2009

(54) AMBIENT LIGHT LENS

(75) Inventors: Thomas Kracker, Marysville, OH (US); Tony Wang, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 11/190,673

(22) Filed: Jul. 27, 2005

(65) Prior Publication Data

US 2007/0024993 A1    Feb. 1, 2007

(51) Int. Cl.
*G02B 7/02* (2006.01)

(52) U.S. Cl. ........................................ 359/811; 359/819

(58) Field of Classification Search ................ 359/811, 359/819, 822, 823, 829; 362/488, 487; 263/488, 263/487

See application file for complete search history.

(56) References Cited

U.S. PATENT DOCUMENTS

| | | | |
|---|---|---|---|
| 4,534,614 A * | 8/1985 | Silverglate | .................. 250/216 |
| 5,499,166 A | 3/1996 | Kato et al. | |
| 5,523,933 A * | 6/1996 | Swanson | ..................... 362/390 |
| 5,601,354 A | 2/1997 | Horii et al. | |
| 5,772,306 A * | 6/1998 | Okuchi | ........................ 361/507 |
| 5,921,671 A | 7/1999 | Okuchi et al. | |
| 6,056,426 A | 5/2000 | Jenkins | |
| 6,193,399 B1 | 2/2001 | Hulse | |
| 6,283,621 B1 * | 9/2001 | Macri | .......................... 362/488 |

\* cited by examiner

*Primary Examiner*—Scott J Sugarman
*Assistant Examiner*—Brandi N Thomas
(74) *Attorney, Agent, or Firm*—Rankin, Hill & Clark LLP; Mark E. Duell

(57) ABSTRACT

A lens is provided for use in a vehicle interior ambient light device. The lens provides a beam of light that is narrower and is directed to a desirable position on different vehicle models and versions of those models. The lens includes an upper section having a shape that is a section of a frustum of a cone. The lens also includes a lower section having a shape of a frustum of an oblique cone with an oval base. Textured surfaces of the sides of the frustum of the lower section prevent the emission of stray light beams.

13 Claims, 4 Drawing Sheets

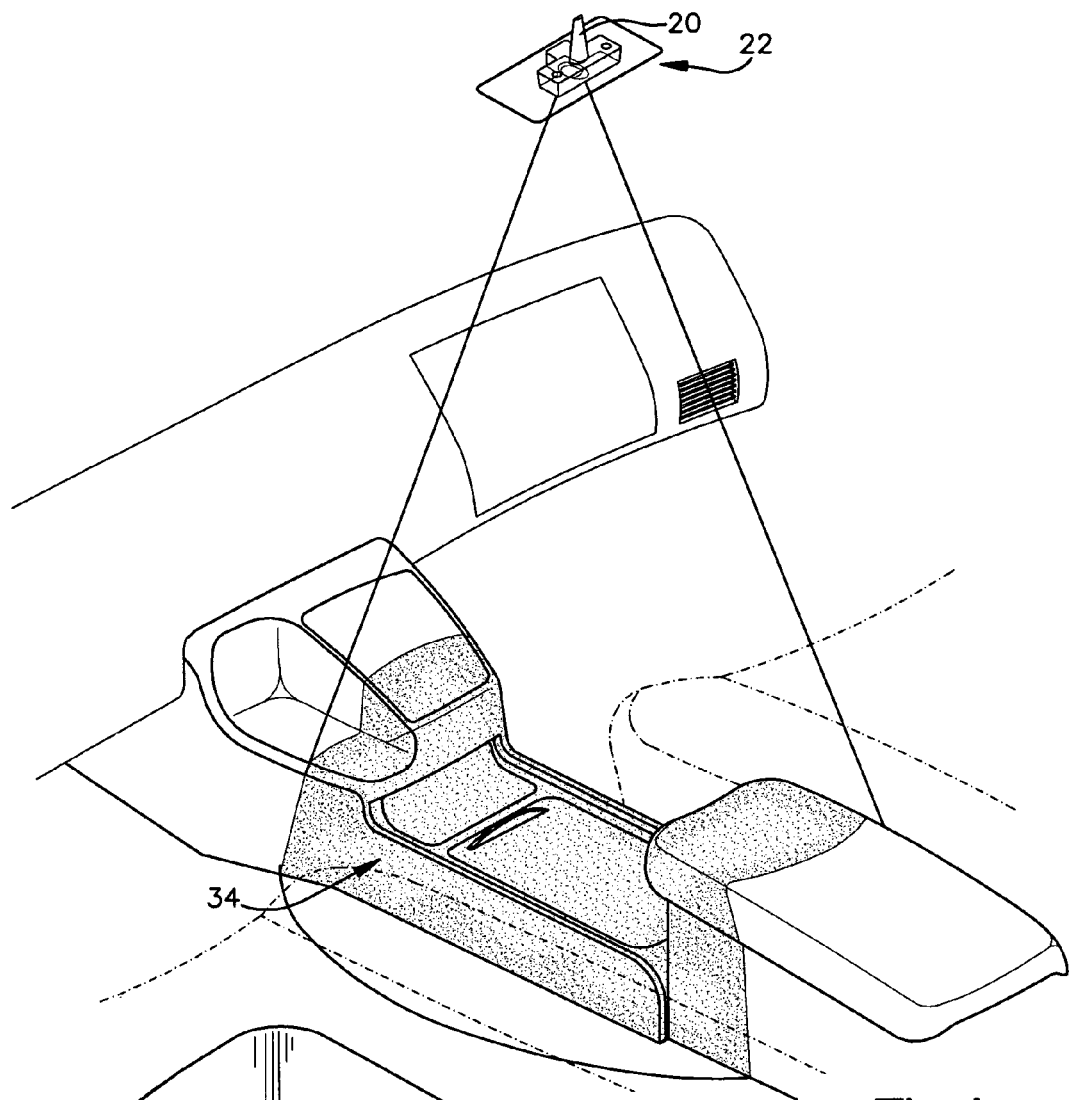
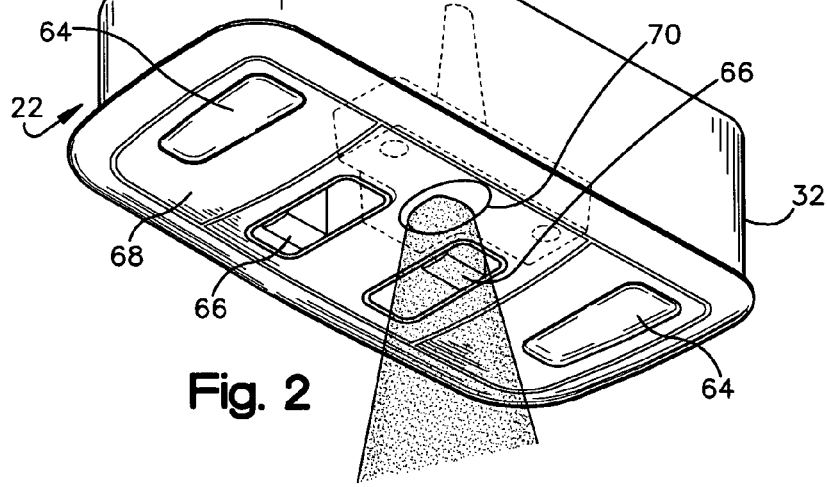

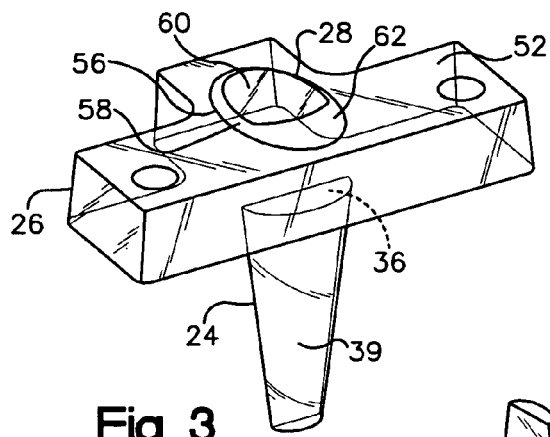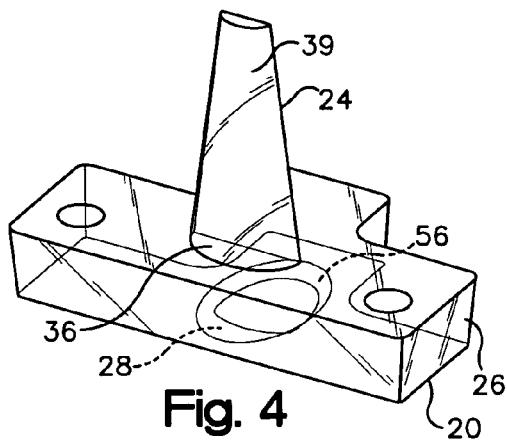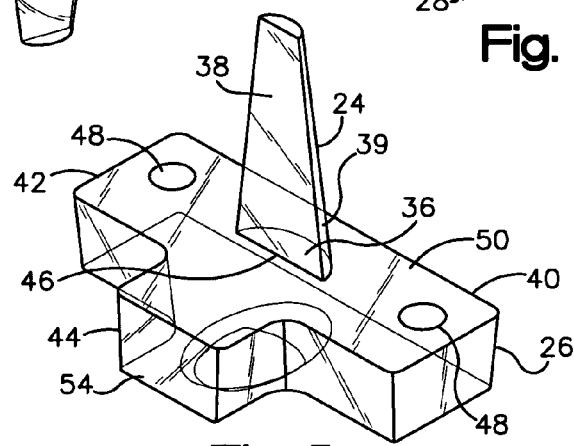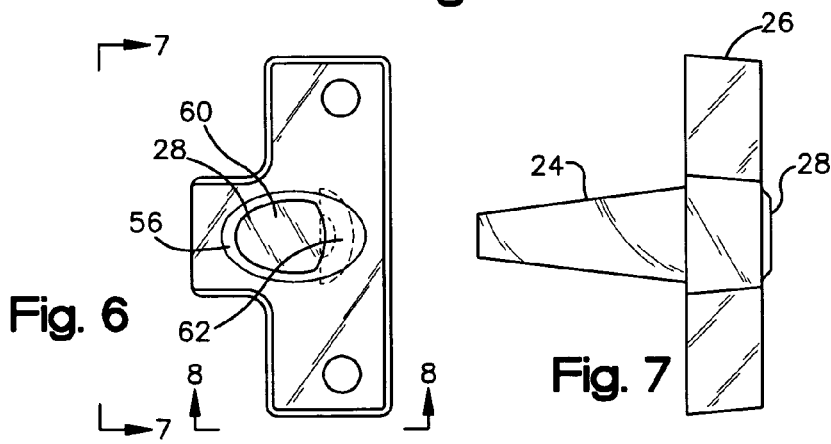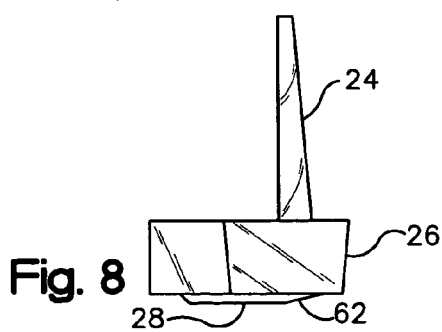

AMBIENT LIGHT LENS

BACKGROUND OF THE INVENTION

Modern automobiles are equipped with several items that are designed to promote the comfort and convenience of the driver and passengers. For example, seats may be provided that include heater elements and numerous holders and pockets may be provided for cell phones, compact disks, etc. An additional convenience feature is an ambient light generator that is activated whenever the automobile headlights are switched on. The ambient light provided allows occupants of the vehicle, without resorting to using an overhead or map light, to see items in the passenger compartment that are not visible by the light of the dashboard.

The ambient light generator is typically included within a module that also includes map lights and is affixed to the ceiling of the passenger compartment. The ambient light generator includes a light source and a device to direct the light. The light directing device is not adjustable. Light is directed toward the center console, specifically the storage area so items stored therein can be accessed easily.

The module that holds the ambient light generator is used on a number of different vehicle models, including both two door and four door versions of particular models. The layout of the center console varies between two door and four door versions of common vehicle models. Unfortunately, known light directors do not provide beam patterns that are desirable for both two door and four door versions. Typically in one version of the vehicle model, too much ambient light is directed to the center armrest that is located behind the storage areas in the center console. What is desired is a device for directing ambient light from a light source in a beam that is desirable for alternate configurations of center consoles that does not require completely retrofitting the entire ambient light generator.

BRIEF SUMMARY OF THE INVENTION

The present invention overcomes the deficiencies of the prior art by providing an improved lens for use in a vehicle interior lighting device that provides ambient light. The invention provides a lens that includes an upper section that is a portion of a solid frustum of a cone, a middle support section, and a lower section that is a solid frustum of an oblique cone with an oval base.

The lens of the present invention may be easily integrated with other parts of a generic interior lighting device that is used for multiple vehicle models and model versions. Thus, generic interior lighting devices can be manufactured, with differences only in the lenses used, and significant manufacturing savings can be realized. The lens of the present invention minimizes unwanted reflections that cause stray light. A narrow beam is generated that is concentrated on the storage areas of the center console and not the arm rest. These and other features, aspects and advantages of the present invention will be fully described by the following description, appended claims, and accompanying drawings.

BRIEF DESCRIPTION OF THE FIGURES

FIG. 1 is a perspective view of an interior lighting device over a center console of a vehicle;

FIG. 2 is a perspective view of a light module of the present invention;

FIG. 3 is a first perspective view of the lens of the present invention;

FIG. 4 is a second perspective view of the lens of the present invention;

FIG. 5 is a third perspective view of the lens of the present invention;

FIG. 6 is a bottom view of the lens of the present invention;

FIG. 7 is a front elevational view of the lens of the present invention;

FIG. 8 is a side elevational view of the lens of the present invention;

DETAILED DESCRIPTION OF THE INVENTION

Figure 11:
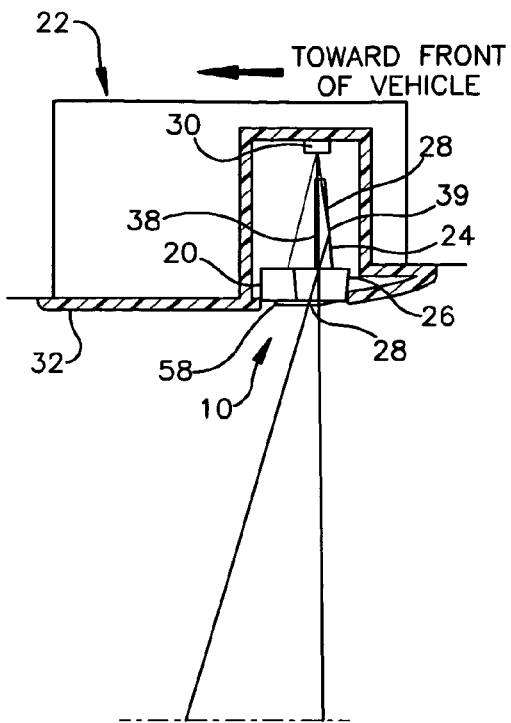
FIG. 11 is a side elevational view of an interior lighting device of the present invention.

Referring to the drawings, specifically FIGS. 1, 3 and 11, a preferred lens 20 for use with a vehicle interior lighting device 22 is illustrated. The lens 20 includes an upper section 24, middle support section 26 and lower section 28 as described in more detail below. The vehicle interior lighting device 22 includes, in addition to the lens 20, a source of light 30, and a module 32 to hold the lens 20 and light source 30. The interior lighting device 22 is mounted on or near the roof of a vehicle passenger compartment and provides ambient light allowing vehicle occupants to find items in the vehicle's center console area 34 at night or other times when additional light is required inside of the vehicle.

Referring to FIGS. 2-7, the lens upper section 24 is a portion of a frustum of a cone. The upper section 24 is formed from a transparent solid such as polycarbonate (PC) resin or Polymethylmethacrylate (PMMA) resin. However, any transparent material may be used. Preferably, the frustum is of a right cone (cone with a 90 degree angle between the base and a vertical line from the base center to the cone point) with a circular base. The upper section 24 is shaped as if a plane were passed through a complete frustum, perpendicular to the base 36 and a section removed. Preferably the frustum is bisected, although the plane may be passed through the frustum across any portion of the diameter of the base 36, leaving a flat side 38 and a curved side 39. The angle between the base 36 and curved side 39 is selected based on the desired light beam width to be projected on the vehicle console. The flat side 38, defined by the planar sectioning, is configured toward the front of the vehicle when the lens 20 is installed. The upper section 24 is integrally formed with the middle section 26 of the lens 20.

The middle section 26 is configured between the upper section 24 and lower section 28 of the lens 20 and provides support positions for the lens 20 to be supported on the module 32. The middle section 26 is somewhat T-shaped, having three arms 40, 42 and 44 that extend from a center portion 46 in which the upper section 24 meets the middle section 26. First and second arms 40 and 42 extend in generally opposite directions from the center portion 46. The first and second arms 40 and 42 have generally equivalent lengths and each defines an aperture 48 extending from an upper surface 50 to a lower surface 52 thereof. The third arm 44 is generally shorter than the first and second arms 40 and 42 and also extends from the center position 46 of the middle section 26. The third arm 44 is generally orthogonal to both the first and second arms 40 and 42. All three arms have generally equal thicknesses and have upper surfaces on a common plane. Preferably, the thickness of the entire middle section 26 decreases slightly from the distal end 54 of the third arm 44 to the side of the middle section 26 opposite the third arm 44.

The lower section 28 is generally shaped as a solid frustum of an oblique cone having an oval base 56, side walls 58, and end surface 60, and a chamfered surface 62. The lower section 28 is formed integrally with the middle section 26 and projects therefrom. The sides 58 of the lower section 28 can be textured to prevent exit of stray light. The end surface 60 opposite the middle section 26 is polished to allow the direct passage of light. The height of the lower section 28 is generally less than the height of the upper section 24. The chamfered surface 62 is provided on a portion of the circumference of the end surface 60 opposite the middle section 26 and opposite the third arm 44. When installed in a vehicle, the chamfered surface 62 is located toward the rear of the vehicle.

Referring to FIGS. 2 and 11, the module 32 which receives the light source 30 and lens 20 is generally rectangular and includes two map lights 64 and switches 66 for activating and deactivating the map lights 64. Near the center of a face 68 of the module 32 that faces the passenger compartment, a hole 70 is defined through which ambient light output by the lens is emitted. The module 32 includes circuitry for communicating with controls in the automobile, thus, allowing a signal to be received by the interior lighting device when the lights of the automobile are turned on and off.

Referring to FIG. 11, light is emitted from the light source 30 that is oriented with its center just above the side wall 38 of the upper section 24 of the lens 20. Light from the light source 30 enters the lens 20 through a narrow end of the upper section 24. The small surface area of the narrow end of the upper section 24 reduces the number of beams brought into the lens subject to internal reflections.

Additionally, the relative positioning of the light source 30 and lens 20 affects the direction of emission of reflected beams. As shown in FIG. 11, some beams emitted by the light source 30 proceed directly through the lens 20 without reflection. The generally conical shape of the upper section 24, with the top of the cone being where light enters, minimizes the number of internal reflections taking place inside of the lens 20. Slightly angled beams that enter the lens away from the center of the upper portion 24 follow the angle of the side 39 instead of colliding with the side as is common in a generally cylindrical lens. A number of substantially angled beams, directed toward the front of the vehicle will not enter the lens at all due to the relative position of the lens and light source 30 and the configuration of lens side 38 and will be absorbed by the middle section 26 of the lens 20 or another part of the module 32. Substantially angled beams, directed toward the rear of the vehicle, will reflect off of the side 39 and back toward the front of the vehicle.

The light then passes through the middle section 26. The three arms 40, 42 and 44 of the middle section 26 absorb stray beams of light from the light source 30 which do not enter the upper portion 24 of the lens 20.

The light then passes through the lower section 28. The textured sides 58 of the lower section 28, including the chamfered edge 62 configured toward the rear of the vehicle prevent ambient light from leaking rearward. After exiting the lens 20, the light passes through the hole 70 of the module 32. Comparison of FIGS. 11 and 12 shows differing light patterns, the pattern of FIG. 12 being more spread and that of FIG. 11, more concentrated.

Figure 12:
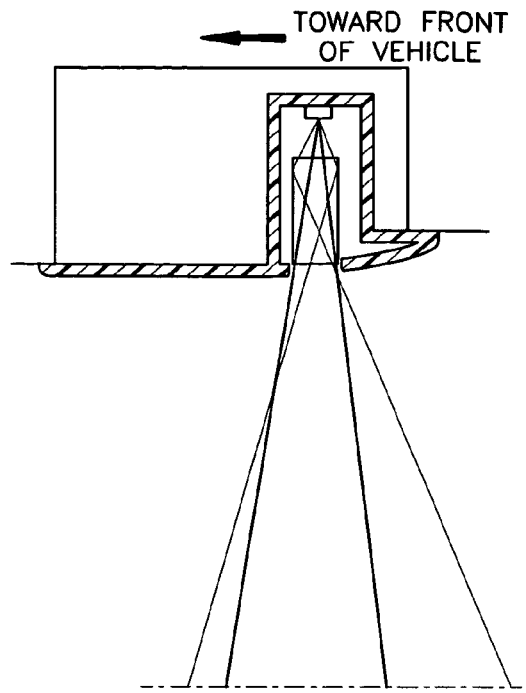
FIG. 12 is a side elevational view of a generally cylindrical interior lighting device.
Figure 13:
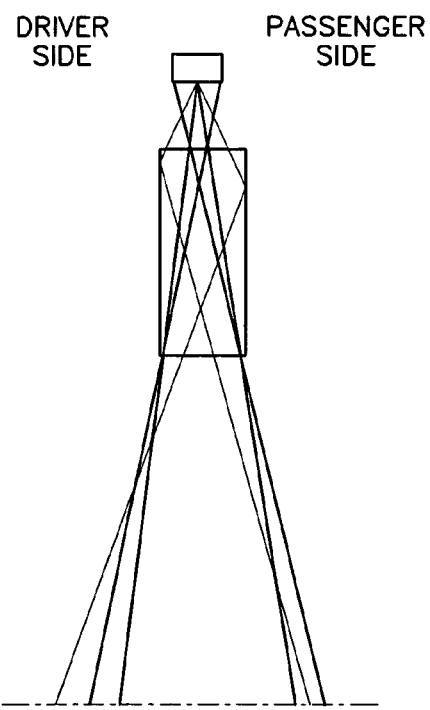
FIG. 13 is a rear elevational view of a generally cylindrical lens and light source.
Figure 14:
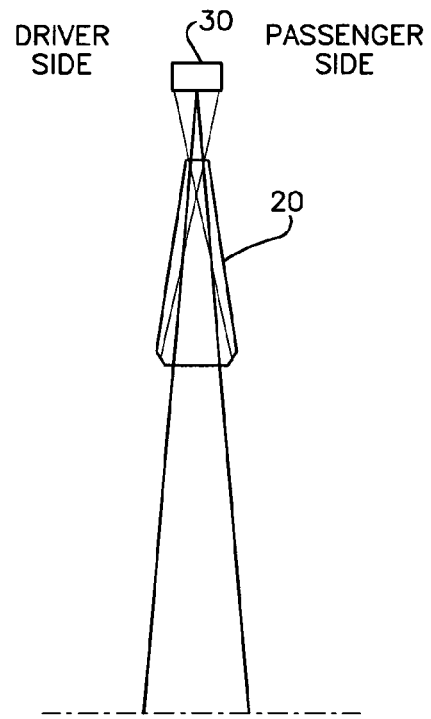
FIG. 14 is a rear elevational view of a lens and light source of the present invention.

As a result, light that passes through the lens 20 of the present invention, shown in FIGS. 11 and 14 is guided by its shape to be a more narrow beam with gradual light transitions as compared to a common generally cylindrical lens shown in FIGS. 12 and 13.

Figure 9:
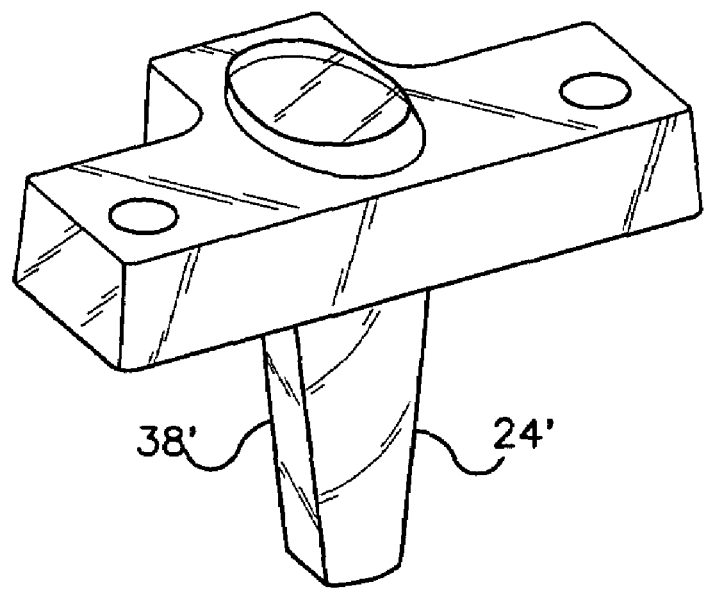
FIG. 9 is a first perspective view of an alternate embodiment of the present invention.
Figure 10:
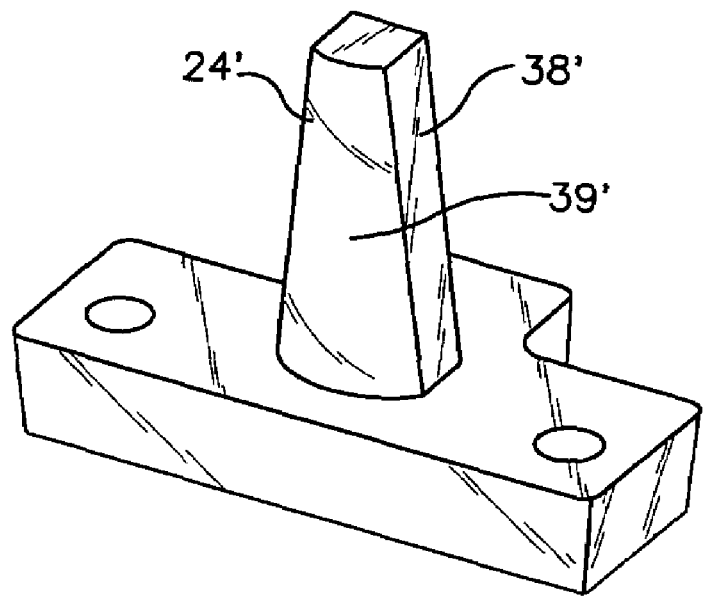
FIG. 10 is a second perspective view of an alternate embodiment of the present invention.

In an alternate embodiment of the invention shown in FIGS. 9 and 10 the upper section 24' of the lens includes additional flat sides 38' and a smaller curved side 39'. As previously described above with respect to flat side 38, the additional flat sides 38' reduce the surface area where beams can enter the upper section of the lens, which in turn reduces the number of internal beam reflections.

Instead of a frustum of an oblique cone, the lower section 28 may be manufactured as a frustum of a right cone and include a greater amount of chamfering on one section of the circumference than other sections of the circumference on a side opposite the middle section.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A lens for use with a vehicle interior lighting device, the lens comprising:
    an upper section that is a portion of a solid frustum of a cone;
    a middle support section; and
    a lower section that is a solid frustum of a cone with a generally oval base,
    wherein the middle support section comprises a first protruding arm, a second arm protruding in a direction generally opposite the first arm, and a third arm generally orthogonal to the first and second arms.

2. The lens of claim 1, wherein the upper section, middle support section and lower section are integrally formed.

3. The lens of claim 1, wherein the middle support section further defines two apertures for mounting the lens to the vehicle interior lighting device.

4. The lens of claim 1, wherein the solid frustum of the lower section includes side walls that are textured to block light reflections.

5. The lens of claim 1, wherein the solid frustum of the lower section includes an end surface generally opposite the base, wherein the end surface is polished.

6. The lens of claim 1, wherein the upper section is a portion of a solid frustum of a right cone.

7. The lens of claim 6, wherein the upper section is a remainder of a frustum sectioned by a plane generally perpendicular to a base of the frustum of the upper section.

8. The lens of claim 7, wherein the plane bisects the frustum of the upper section.

9. The lens of claim 6, wherein the upper section is a remainder of a frustum sectioned by a plane perpendicular to a base of the frustum and further sectioned by two additional planes having angles with respect to the base of the frustum that are generally equal to the angles of the frustum sides with respect to the frustum base.

10. The lens of claim 1, wherein a light beam passing through the upper section of the lens will also pass through the lower section of the lens.

11. The lens of claim 1, wherein the lower section is a solid frustum of an oblique cone.

12. The lens of claim 1, wherein the lower section is a solid frustum of a right cone and a portion of the circumference of the lower section, opposite the middle section is additionally chamfered.

13. A vehicle interior lighting device comprising: a lens having:
- an upper section that is a portion of a solid frustum of a cone;
- a middle support section;
- a lower section that is a solid frustum of an oblique cone with a generally oval base;
- a source of light, the light being directed through the lens; and
- a module supporting the source of light and lens, the module being attachable to the vehicle, wherein the middle support section comprises a first protruding arm, a second arm protruding in a direction generally opposite the first arm, and a third arm generally orthogonal to the first and second arms.

\* \* \* \* \*